(12) United States Patent  
Meyer et al.

(10) Patent No.: US 12,416,916 B2
(45) Date of Patent: Sep. 16, 2025

(54) COMMAND AND CONTROL OF MOBILE ENTITIES WITH REDUCED CREW

(71) Applicants: Airbus Defence and Space GmbH, Taufkirchen (DE); AIRBUS DEFENCE AND SPACE, S.A.U., Getafe (ES)

(72) Inventors: Jörg Meyer, Mainburg (DE); Álvaro Linares Enriquez, Madrid (ES)

(73) Assignees: Airbus Defence and Space GmbH, Taufkirchen (DE); Airbus Defence and Space S.A.U., Madrid (ES)

( * ) Notice: Subject to any disclaimer, the term of this patent is extended or adjusted under 35 U.S.C. 154(b) by 369 days.

(21) Appl. No.: 17/590,204

(22) Filed: Feb. 1, 2022

(65) Prior Publication Data

US 2022/0269265 A1   Aug. 25, 2022

(30) Foreign Application Priority Data

Feb. 25, 2021   (EP) .................................. 21382162

(51) Int. Cl.
*G05D 1/00*   (2024.01)
*H04W 4/40*   (2018.01)

(52) U.S. Cl.
CPC ........... *G05D 1/0027* (2013.01); *G05D 1/104* (2013.01); *H04W 4/40* (2018.02); *B64U 2201/102* (2023.01); *B64U 2201/20* (2023.01)

(58) Field of Classification Search
CPC .... G05D 1/0027; G05D 1/104; B64C 39/024; H04W 4/40; B64U 2201/102; B64U 2201/20
See application file for complete search history.

(56) References Cited

U.S. PATENT DOCUMENTS

| 9,529,357 | B1 | 12/2016 | Eggers et al. | |
| 10,218,893 | B2 * | 2/2019 | Iwakura | B64C 13/20 |
| 10,268,191 | B1 * | 4/2019 | Lockwood | G05D 1/0027 |
| 11,473,913 | B2 * | 10/2022 | Koubaa | G05D 1/1064 |
| 12,038,767 | B2 * | 7/2024 | Huang | H04W 4/029 |
| 2010/0241289 | A1 | 9/2010 | Sandberg | |
| 2011/0054689 | A1 | 3/2011 | Nielsen et al. | |

(Continued)

FOREIGN PATENT DOCUMENTS

DE   10 2016 212 150 A1   1/2018

OTHER PUBLICATIONS

European Office Action for Application No. 21382162 dated Apr. 5, 2023.

(Continued)

*Primary Examiner* — Jean Paul Cass
(74) *Attorney, Agent, or Firm* — KDW Firm PLLC

(57) ABSTRACT

A system for controlling operation of mobile entities includes mobile entities and a master entity communicatively coupled to each one of the mobile entities. Each of the mobile entities includes a control module and at least one function component. The control module controls operation of the at least one function component and operates in either a first state, a second state, or a third state. Depending on the state in which the control module is operated, the function components are controlled either by the control module in an autonomous manner, or control of the function components is partly or entirely assigned to a human operator.

10 Claims, 2 Drawing Sheets

(56) References Cited

U.S. PATENT DOCUMENTS

2018/0262674 A1    9/2018  Iwakura et al.
2019/0196464 A1    6/2019  Lockwood et al.
2024/0078915 A1*   3/2024  Roper, Jr. ................ G08G 5/56

OTHER PUBLICATIONS

European Search Report for Application No. 21382162 dated Jul. 28, 2021.

* cited by examiner

COMMAND AND CONTROL OF MOBILE ENTITIES WITH REDUCED CREW

CROSS-REFERENCE TO RELATED APPLICATION

This application claims priority to European Patent Application No. 21382162.2 filed Feb. 25, 2021, the entire disclosure of which is incorporated by reference herein.

TECHNICAL FIELD

The disclosure herein relates to command and control of mobile entities like, for example, unmanned aerial vehicle. In particular, the disclosure herein relates to a system for controlling and monitoring operation of a plurality of mobile entities.

BACKGROUND

In recent years, autonomous operation of vehicles has become more and more important. Autonomous operation may be used in land vehicles, watercraft, submarine vessels, and aircraft. Automation may be implemented at different levels to define the increasing level of automation. For example, automation may be implemented at a first level where automation systems assist a human operator. At a second level of automation, the vehicle may be operated with partial automation in which some functions are executed autonomously while other functions are executed by a human operator. The third level may be described as conditional automation. At this level, the vehicle is operated autonomously under certain conditions without the need for a human operator under the conditions, but the human operator needs to monitor the vehicle and be ready to take over control at any time. A fourth level of automation relates to a vehicle that is capable of performing all operation functions under certain conditions. A fifth level of automation describes full automation and relates to a vehicle that is capable of performing all operation functions under all conditions. At the fifth level, the human operator may have the option to take over control.

DE 10 2016 212 150 A1 describes an unmanned aerial vehicle that is able to execute certain functions autonomously in order to assist a remote pilot who controls the aircraft.

While several functions of automation are already implemented in unmanned vehicles, there may be a need to further reduce the workload for a remote crew that controls multiple unmanned vehicles.

SUMMARY

Therefore, it is an object to provide a system with reduced workload for the human crew that operates a fleet or a swarm of unmanned vehicles. This object is solved by the disclosure herein.

A system for controlling operation of a plurality of mobile entities is disclosed. Further developments of the system are disclosed in the following description.

According to an aspect, a system for controlling operation of a plurality of mobile entities is provided. The system comprises a plurality of mobile entities and a master entity, that is communicatively coupled to each one of the plurality of mobile entities. Each of the mobile entities comprises a control module and at least one function component. The control module is configured to control operation of the at least one function component. The control module is configured to operate in either a first state, a second state, or a third state. In the first state, the control module is configured to receive input data from the at least one function component, generate control commands for controlling the at least one function component based on the input data, and autonomously control the at least one function component based on the control commands. In the second state, the control module is configured to receive input data from the at least one function component, generate preliminary control commands for controlling the at least one function component based on the input data, transmit the preliminary control commands to the master entity, control the at least one function component based on the preliminary control commands when the master entity does not overrule the preliminary control commands within a predetermined time period, otherwise, control the at least one function component based on control commands received from the master entity. In the third state, the control module is configured to receive input data from the at least one function component, forward the input data to the master entity, receive control commands from the master entity, and control the at least one function component based on the control commands received from the master entity.

This system architecture reduces the effort for a remote crew to control a fleet of unmanned mobile entities, like unmanned aerial vehicles. When a mobile entity is in the first state, it is autonomously controlled by the control module of that mobile entity, particular attention by a human operator is not required. A mobile entity is in the first state when it is able to follow a predetermined mission plan. When the mobile entity is in the second state, it might need input from the crew, i.e., might require a remote human pilot to intervene and take over control of the mobile entity. However, in the second state, the mobile entity still determines at least one option for continuing the mission and transmits that option (the preliminary control commands) to the master entity. When the crew has no objections against the preliminary control commands, i.e., does not overrule the preliminary control commands within a predetermined time period, the mobile entity is controlled by the control module of that mobile entity based on the preliminary control commands. In an embodiment, when the crew has no objections against the preliminary control commands, the acceptance or approval of preliminary control commands is automatically sent to the mobile entity. When the mobile entity is in the third state, it requires control input by the crew and is controlled based on the control commands received from the crew. In the third state, the mobile entity proposes an option, but does not execute the commands of that option unless explicitly confirmed by the crew or provided with other commands by the crew. In the third state, when no control commands are received from the master entity or the proposed control commands are not confirmed within a certain time, the mobile entity may execute a contingency maneuver or abort the mission in order to achieve a safe state.

Although the state transitioning is described from the first state to the second state and from the second state to the third state, the control module may transition from the first state directly to the third state under certain predetermined conditions that require the third state to be active, i.e., when the mobile entity is not able to operate under given conditions. Likewise, when the external factors that initiated a state change from the first state to the second or third state and from the second state to the third state are not present anymore, the control module transitions back to the second state or to the first state.

The mobile entity operates in the first state when it is able to follow a mission plan and no events (internal or external) occur that cannot be resolved by the control module of the mobile entity. The mobile entity transitions from the first state into the second state when any internal or external events occur that may have an impact on the execution of the mission but nevertheless can be handled by the control module of the mobile entity. The preliminary control command does not need approval by a human operator but it can be overruled within a predetermined time, e.g., five to ten seconds. The preliminary control command may be autonomously accepted by the master entity within a predetermined time if there is no human action in the master entity. For example, and in an embodiment, in the second state, the mobile entity needs to receive a command confirmation from the master entity. In this embodiment, after a predetermined time period, if there is no human action, the command confirmation is sent autonomously by the master entity to the mobile entity (in this case, the preliminary control command is not overruled, it is confirmed). Otherwise, if there is a human action, this resolution proposal can be accepted and sent by the master entity to the mobile entity within the predetermined time period and not waiting for the time period to be over (the preliminary control command is overruled). The preliminary control command can also be modified by the operator in the master entity. When the master entity confirms the preliminary control command without any modifications thereto, then this is deemed as not overruling the preliminary control command.

The mobile entity transitions from the second state to the third state when any event occurs that requires input from the crew, i.e., when the control module of the mobile entity is not able to follow the mission plan. However, in the third state, the control module nevertheless proposes an option for controlling the mobile entity, but it does not execute this option unless explicitly approved. In other words, in the third state, explicit acceptance, approval, or control commands from a human operator are required for controlling the mobile entity.

The control module of the mobile entity may be a functional component of a flight computer that is connected to components of an aircraft and configured to control the aircraft to execute a mission plan.

Summing up, the mobile entities are configured to operate in one of three states that require different level of attention from the remote human crew. When the mobile entities are in a state that requires no attention from the remote crew, this is indicated to the crew by transmitting the respective state information so that the crew is explicitly informed about the fact that the mobile entity is in the first state and no human intervention is needed. In the second state, the crew needs to monitor the mobile entity, but not necessarily has to take over control. By transitioning the mobile entities into the applicable state and by informing the crew about the state of the mobile entities, the workload of the crew is reduced.

In one example, the mobile entity may operate in one of more than three states, i.e., it is to be understood that the three states referred to in this document are a minimum number of states for defining the operation mode of the aircraft and the related control operations.

According to an embodiment, in the first state, the control module is further configured to transmit the input data to the master entity.

Thus, the master entity is provided with all available data about all mobile entities at any time so that the master entity has an overview of the status of the plurality of mobile entities, which may be referred to as fleet or swarm.

According to a further embodiment, in the third state, the control module is further configured to generate proposed control commands for controlling the at least one function component based on the input data and transmit the proposed control commands to the master entity.

In this embodiment, the control module of the mobile entity provides a proposal for a control command or a related and possible action to the master entity. The crew may then either accept the proposed control command or may command the mobile entity with an alternative control command.

According to a further embodiment, each mobile entity is configured to transmit an alert signal to the master entity when the mobile entity transitions from the first state to the second state or to the third state and when the mobile entity transitions from the second state to the third state.

The alert signal is used in the master entity to cause an alert so that the crew directs their attention to the management module and/or remote control module.

According to a further embodiment, the at least one function component of the mobile entity is one or more of an engine, a control surface, a sensor, and a payload.

The control module controls the function components to execute a mission plan. For this purpose, the control module may control the engine and/or the propulsion drive of the mobile entity, one or more control surfaces, one or more sensors that are configured to sense the surroundings of the mobile entity (optical camera, infrared camera, electromagnetic sensors like radar or lidar, acoustic sensors, ultrasonic sensors, etc.), one or more payloads (for example, the mobile entity may be equipped with internal or external payloads that are required for accomplishing an mission; payloads may be optional and interchangeable components that are used to selectively provide functions to the mobile entity as needed for a certain mission).

According to a further embodiment, the mobile entity is an unmanned aerial vehicle.

The system is configured so that multiple mobile entities can be controlled by a crew, wherein the control module of the mobile entity is operated in one of the three states indicated above. Thus, the workload of the crew is reduced because the control module performs certain control tasks autonomously without involving the crew (first state) or with just informing the crew about the preliminary control command and giving the crew the option to overrule, while no action is needed when the crew approves the preliminary control command (second state). Full control of the mobile entity is required in the third state only.

The system as described herein may be applied to a fleet of mobile entities which are unmanned aerial vehicles, high-altitude pseudo-satellites, unmanned space vehicles, unmanned land vehicles, unmanned submarine vessels, or unmanned watercrafts.

According to a further embodiment, the master entity comprises a management module and multiple remote control modules, and the management module is configured to observe the state of all mobile entities. The management module is configured to assign controlling of a first mobile entity to a first remote control module, so that the first remote control module specifically controls the first mobile entity.

The master entity may be referred to as operations center. The master entity has an overview of the mobile entities (position, heading, resources, state of the control module of each mobile entity, etc.) of the entire fleet. When one of the mobile entities transitions to the second or third state, the master entity is informed accordingly and may assign monitoring or controlling a specific mobile entity to a remote human operator or remote pilot.

According to a further embodiment, the master entity is stationary or mobile.

For example, the master entity may be a ground station, or it may be located aboard a mobile vehicle like an aircraft, spacecraft, watercraft, or land vehicle. The management module and the remote control modules may be located in a ground station or in a mobile station like an aircraft. In one embodiment, the management module and the remote control modules are located in the same or in a different mobile station and are interconnected with each other via a data link.

According to a further embodiment, the remote control module comprises a human-machine-interface for enabling a human operator to interact with the remote control module, and the remote control module comprises a control module that is configured to generate and transmit control commands to the mobile entity.

A human operator takes a decision on how to continue the mission of the mobile entity and communicates the decision via the human-machine-interface. Based on the action determined by the operator, the remote control module generates the control commands and transmits these control commands to the mobile entity so that the mobile entity is controlled in accordance with the input of the human operator (member of the crew). In other words, the remote control module is configured to control a mobile entity. This is particularly done when the mobile entity is in the second state or in the third state. However, when a mobile entity is in the first state, the mobile entity may send status update messages to inform the master entity about the status of the mobile entity so that it can be observed via the management module and/or the remote control module.

According to a further embodiment, the master entity comprises a communication interface and each mobile entity comprises a communication interface. Each mobile entity is configured to establish a wireless data link to the master entity via the respective communication devices.

A communication interface may be an antenna that is used to receive and transmit data. In particular, a wireless data link may be established between each mobile entity and the master entity to exchange data related to the status of the mobile entity and control commands for controlling the mobile entity. The data link may be a bidirectional data link or it may use two distinct communication channels for transmitting data in either direction.

The data link between the mobile entity and the master entity may be a direct data link or there may be an intermediate station between the mobile entity and the master entity, like a relay station, a repeater, or a communication satellite. The relay station or repeater may be a stationary arrangement on earth or a mobile vehicle.

According to a further embodiment, the mobile entity and the master entity are configured to request data and/or receive commands from an air traffic control, wherein the requested data relate to the air traffic in the surroundings of the mobile entity, a route change, and/or and altitude change, wherein the control module of the mobile entity is further configured to generate commands for controlling the mobile entity based on the data from the air traffic control.

According to a further embodiment, in the second state, the time period within which the master entity can overrule the preliminary control commands generated by the control module of the mobile entity is 10 seconds or less.

However, it is to be understood that this time period is merely example in nature and not limiting. The duration of the time period can be varied depending on the mission profiles of the mobile entities.

BRIEF DESCRIPTION OF THE DRAWINGS

The subject matter will hereinafter be described in conjunction with the following drawing figures, wherein like numerals denote like elements, and wherein.

DETAILED DESCRIPTION

Figure 1:
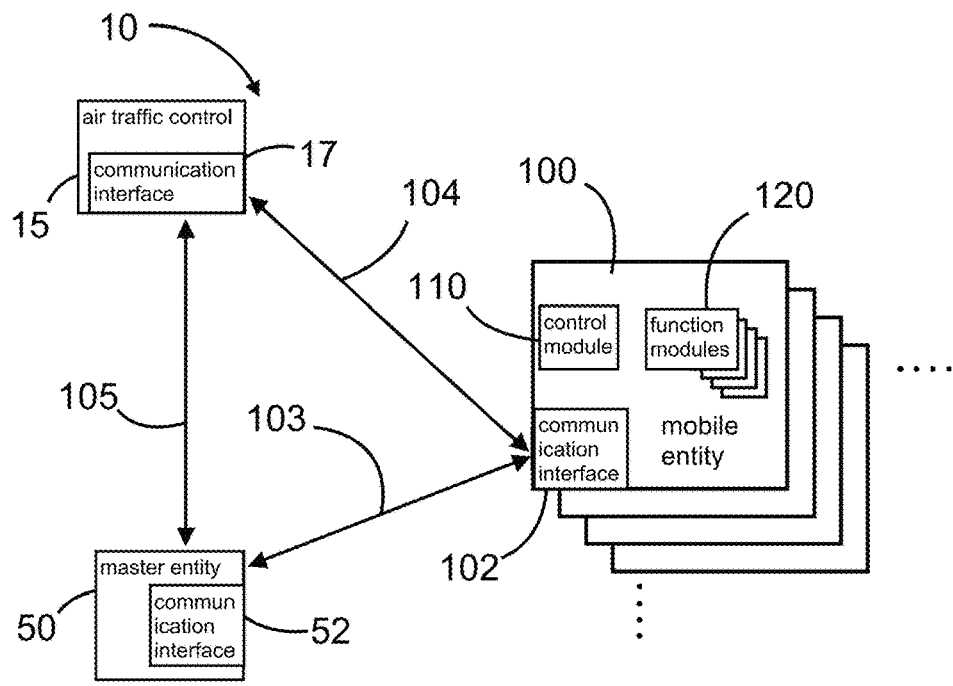
FIG. 1 is a schematic representation of a system for controlling operation of a plurality of mobile entities.

The following detailed description is merely example in nature and is not intended to limit the disclosure herein and uses of the disclosure herein. Furthermore, there is no intention to be bound by any theory presented in the preceding background or the following detailed description.

The representations and illustrations in the drawings are schematic and not to scale. Like numerals denote like elements.

A greater understanding of the described subject matter may be obtained through a review of the illustrations together with a review of the detailed description that follows.

FIG. 1 shows as system 10 for controlling operation of a plurality of mobile entities 100. The system 10 comprises multiple mobile entities 100 and a master entity 50. The mobile entities 100 may be aerial vehicles that are controlled remotely by human operators and that may execute at least some tasks of a mission autonomously or partly autonomous. The mobile entities may be similar in structure and function. A mobile entity comprises a control module 110 and multiple function components 120. The control module is communicatively connected to the functions components 120 and is configured to send control commands to the function components and receive data (status data, sensor data, etc.) from the function components. The mobile entity 100 comprises a communication interface 102, e.g., an antenna or the like. By its access to the function components 120, the control module 110 is able to determine the direction of movement of the mobile entity, control payload, engine, control surfaces, derive data from sensors of the mobile entity, etc.

The mobile entity 100 is configured to establish a data link 103 to the master entity. The data link 103 may be a bidirectional link or it may be two unidirectional links so that data can be exchanged either way between the mobile entity 100 and the master entity 50.

The master entity 50 may be a stationary or mobile unit that is configured to monitor and control the mobile entities 100.

FIG. 1 further shows an air traffic control 15 with a communication interface 17. The air traffic control 15 provides air traffic information to the mobile entities 100 and to the master entity 50 via the communication interface 17 and the data links 104, 105, which are similar to the data link 103. While FIG. 1 shows an air traffic control arrangement 15, this arrangement 15 is not part of the system 10, the arrangement 15 is merely used by components of the system 10 for deriving information about the air traffic in the surroundings of the mobile entities 100.

The mobile entities 100 may be Remotely Piloted Aircraft Systems (RPAS) or Unmanned Aircraft Systems (UAS). The master entity 50 may be a Remote Pilot Station (RPS) that controls the Remotely Piloted Aircraft (RPA) or Unmanned Air Vehicles (UAV). The mobile entities 100 may specially be medium to large RPA (with a maximum take-off weight greater than 150 kg), which are intended to fly in non-segregated airspace with other traffic, and, therefore, may be subject to safety standards used in the aerospace industry.

The system 10 enables control multiple RPAs (tens of RPAs) with reduced crew. To meet this need, the mobile entities 100 have a high level of autonomy and the tasks that require human/crew involvement are reduced. This need is solved by the mobile entity being able to operate in three different states that require no crew involvement (first state), monitoring by the crew but not necessarily active control and command (second state), and controlling the mobile entity by a human operator including providing a proposal for the next action by the mobile entity (third state).

This allows to operate multiple RPAs together in a single operation making possible to the RPS crew to have an awareness situation of the operations progress and the status of the whole RPAs fleet.

The control module 110 of the mobile entity includes a functional block that acts as an autonomy layer on-board the mobile entity 100 and interacts with the function components 120 of the mobile entity 100 on the one hand and the master entity 50 on the other hand. The control module 110 is able to autonomously control the mobile entity and to decide in which state (first state, second state, third state) to operate and communicate with the master entity 50 accordingly (first state: send status information; second state: send status information, send proposal for next action, wait for automatic approval of proposed next action by master entity and execute proposed next action or receive alternative action from human operator and execute alternative action; third state: send status information, send proposal for next action, wait for instructions from master entity). The control module 110 acts an as intermediate layer between the human crew and the lower level systems, i.e., the function modules 120 of the mobile entity. The control module 110 controls the operation of the mobile entity and thereby reduces workload for human crew.

Figure 2:
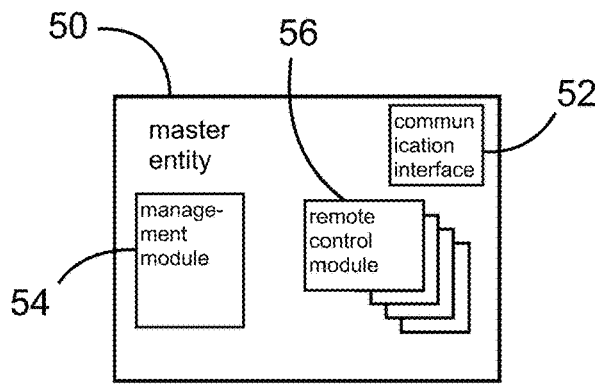
FIG. 2 is a schematic representation of a master entity of the system of FIG. 1.

FIG. 2 shows a detailed view of the master entity 50 and its components. The master entity 50 comprises a management module 54 and multiple remote control modules 56. However, in other configurations, the master entity 50 may comprise more than one management module 54 and may be configured for task sharing between the multiple management modules 54. The communication interface 52 is already described with reference to FIG. 1.

The management module 54 may includes a computer and one or more displays. The management module 54 is configured to display an overview of the entirety of the mobile entities 100. The management module 54 may assign controlling a mobile entity 100 to a specific remote control module 56. Thus, a control link is established between a particular remote control module 56 and a particular mobile entity 100. The status information from that mobile entity 100 is then additionally sent to the assigned remote control module 56 and the remote control 56 is able to control and command the mobile entity 100.

In other words, the management module 54 is configured to selectively establish a 1-to-1-connection between one of the remote control modules 56 and one of the mobile entities 100. Such a connection is shown in FIG. 3.

Figure 3:
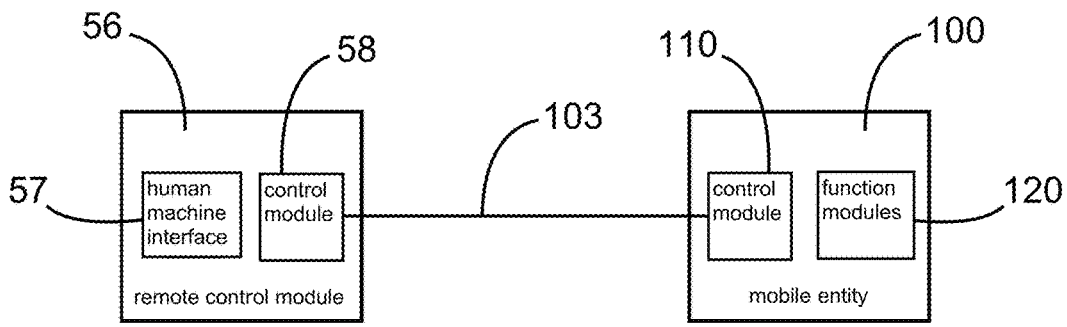
FIG. 3 is a schematic representation of a remote control module that is in communication with a mobile entity.

FIG. 3 shows a remote control module 56 that is connected to a mobile entity 100. The remote control module 56 comprises a human-machine-interface 57 (HMI) and a control module 58. A human operator may view the status of the mobile entity on the HMI (on a display, or the like) and may enter commands via the HMI. The control module 58 of the remote control module 56 transforms the entered commands into control commands and transmit these control commands to the mobile entity 100 via the data link 103.

The control module 110 of the mobile entity receives the control commands transmitted via the data link 103 and creates respective commands for controlling the function modules 120 of the mobile entity. Furthermore, the mobile entity 100 also transmits status update information, state information, etc., to the remote control module 56 via the data link 103.

Figure 4:
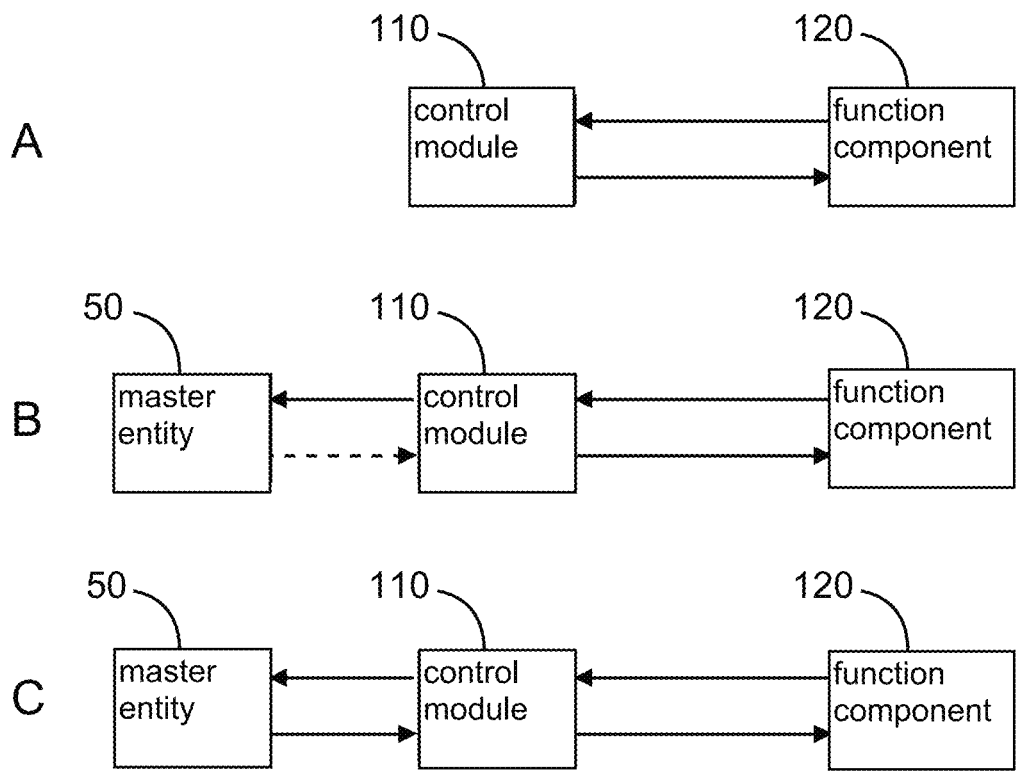
FIG. 4 is a schematic representation of the mode of operation in three different states of the control module of a mobile entity.

FIG. 4 shows the working mode in the three different states of the mobile entity 100.

In the first state, indicated with letter A, the control module 110 of the mobile entity 100 controls the function components 120 and the function components 120 provide data to the control module 110. However, the control module may send status updates to the master entity for the master entity to update a situation picture of the plurality of mobile entities. The communication between the control module 110 and the function component 120 is indicated by two solid line arrows pointing in either direction. In this state, no involvement of operator is required and the main aim in this state is to perform the mission or follow the mission plan. In the first state, the management module 54 monitors and controls the mobile entity, no remote pilot is assigned to the mobile entities that are in the first state.

In the second state, indicated with letter B, the control module 110 of the mobile entity 100 controls the function components 120 the same way as described with reference to the first state. However, when determining an action to execute, the control module 110 informs the master entity 50 and provides the determined action. The master entity 50, i.e., the remote control module 56 (see FIG. 2 and FIG. 3) may then overrule the action determined by the control module 110. This is optional, as indicated by the dashed line. Thus, the remote control module 56 has the option to overrule the control module 110. Without any response from the remote control module 56 within a predetermined time period, the control module 110 continues with the determined action. For example, the control module 110 transitions to the second state, when the mission plan cannot be followed, or when an originally planned destination cannot be reached anymore, or when a deviation is necessary that has a major impact on the mission fulfilment. The second state requires monitoring by a human operator in the master entity 50. In the second state, the management module 54 monitors and controls the mobile entity, and additionally the respective mobile entity is assigned to a remote control module 56, and a remote pilot monitors the mobile entity that is in the second state.

In the third state, indicated with letter C, the control module 110 operates similar to the second state with the difference that the control module 110 requires a command from the master entity 50 in order to perform an action, indicated by the continuous line of the arrow from the master entity 50 to the control module 110. The control module 110 transitions to the third state when the mobile entity is not able to reach the originally planned destination or any contingency landing site, or when the mobile entity status and situation indicates that it must land as soon as possible. In the third state, operator involvement is required to ensure proper behavior of the mobile entity. In the third state, the management module 54 monitors the mobile entity, and additionally the respective mobile entity is assigned to a remote control module 56, and a remote pilot monitors and controls the mobile entity that is in the third state.

Generally, with regard to FIG. 4, continuous lines show a mandatory data flow (information flow or command flow) and dashed lines show an optional data flow.

Again with reference to FIG. 2 and FIG. 3, the management module 54 may be configured as a fleet manager terminal. The management module 54 is configured to assist supervising and controlling multiple mobile entities in autonomous operation. The management module 54 is configured to assign mobile entities 100 to remote control modules 56. The management module may comprise a display that displays the relevant information of a mobile entity fleet, including at least some of the following information: global operation view including a map and the position of the mobile entities, remote pilot status, status of a specific mobile entity, fleet status.

The remote control module 56 is configured for operating the mobile entity, especially in conditions of emergency or contingency, e.g., in the second state or third state.

The control module 110 of the mobile entity 100 is configured to execute certain functions, some of which are: situation assessment, decision making, and reaction implementation.

The function of situation assessment includes at least some of the following tasks: assessment and consolidation of the mobile entity's situation and status by evaluating all relevant mobile entity sub-systems; assessment and consolidation of external events (airport status, other traffic status, etc.); assessment of the system degradation and its resulting deviation from expected condition (e.g., behavior after command execution, flight plan adherence); calculation of the endurance considering all route profiles as well as wind information and evaluation if destination can be reached with sufficient fuel on board The function of decision making includes at least some of the following tasks: generating command advices (proposed action), the control module works situation dependent; observing command requests from other systems (detect and avoid, weather avoidance, air traffic operations laboratory, etc.); support of fleet manager and remote pilot to recover from emergency conditions; generating commands to set required mobile entity configuration (lights, landing gear, etc.), managing link loss mode.

The function of reaction implementation includes at least some of the following tasks: activating command source (air traffic operations laboratory, detecting other traffic and obstacles or terrain and avoid collisions with it, detecting of possible collision threats with terrain and avoidance thereof through evasive maneuvers, detecting adverse weather and initiating an evasive maneuver that keeps the mobile entity outside the bad weather, other sub-system), defining link loss state, defining global mobile entity status, defining state of the mobile entity (first state, second state, third state), commanding required mobile entity configuration (lights, landing gear, etc.), commanding flight maneuvers (e.g., waypoint ID, aborting landing and retrying the landing, for example by using a predetermined route, Takeoff Abort, Climb, Descent).

The master entity 50 is configured to execute certain functions, some of which are: assess status of the control module 110 of the mobile entity, mission planning and monitoring, managing communications, commanding mobile entities, displaying operations.

The function of assessing the status of the mobile entity manages mobile entity data, assesses and consolidates mobile entity and remote control module statuses, manages warnings and estimates fleet manager and remote pilot workload. Fleet manager and remote pilot workload computation functions allows the automatic operator handover function to propose the most suitable operator to monitor the mobile entity in automatic command and control handover processes.

The function of mission planning and monitoring allows to manage the traffic data (air traffic control, unmanned aircraft system traffic management, other airspace users), to manage a mission reference data, provide gateway functionality, negotiate air traffic control and unmanned aircraft system traffic management clearance, prepare/monitor and replan flight plan and manage the mission plan file transfer between different actors involved in the operation.

The function of managing communications allows the fleet manager and remote pilot to manage the communications commands with the mobile entity, air traffic control, unmanned aircraft system traffic management and other airspace users. It also allows the fleet manager and remote pilot to manage the operator handover to transfer the command and control or monitoring of a particular mobile entity between different remote control module operators. The mobile entity is able to start the handover process automatically between fleet manager (management module 54) and remote pilot (remote control module 56) depending on the status of the mobile entity. For automatic operator handover actions started by the control module 110, the human action is not required for the relinquishing operator.

The function of commanding the mobile entity manages the mobile entity resolution proposal or flight plan modification provided by the mobile entity, provides flight management system functionality and the provision of command and control mobile entity commands in the human-machine-interface of the remote control module. The mobile entity resolution proposal is shown in human-machine-interface of the remote control module when fleet manager/remote pilot involvement is required, in order to reduce the fleet manager and remote pilot workload.

The function of displaying operation provides a human-machine-interface, including the following information to fleet manager/remote pilot for any assigned mobile entity: all information necessary to understand the detailed status of the mobile entity; resolution proposals from the mobile entity (proposed action); all information required from the operational environment, including air traffic control and unmanned aircraft system traffic management, weather, etc.; inputs suitable to command the mobile entity in a way to resolve the issue so that third parties are not harmed or disturbed and the mobile entity is protected as good as possible.

The human-machine-interface of the management module 54 may include two different video inputs for displaying different video input: a first video input for receiving command and control functionality and a second video input for receiving mission functionality.

In one example, the cooperation of the control module 110 of the mobile entity 100 and of the master entity 50 (management module 54 and remote control module 56) may be described as follows:

The control module 110 is implemented in all mobile entities 100, assesses the status of the mobile entity and concludes on the status of the mobile entity (first, second, third state). For the first state, the mobile entity will behave according to the planning with no deviation detected. The management module 54 and remote control module 56 and the correspond human crew is not required to tightly monitor the behavior of mobile entities in the first state. In case the control module 110 concludes the mobile entity status to be the second state, a deviation from expected behavior has been identified, requiring adjustment in the mobile entity action. This adjustment will be proposed to the management module 54 and remote control module 56 by the control module 110, considering the crew to be on-the-loop, i.e., the mobile entity will implement the proposed action in case no objection is expressed by the crew. Following implementation of the corrective action, the control module 110 will re-assess the mobile entity status and may transition back to the first state, maintain the second state, or, depending on the circumstances, transition to the third state.

A transition from the first state to the second state implies that a remote pilot is assigned for the monitoring of the particular mobile entity. The fleet manager continues being the responsible person for the command and control of the mobile entity. This assignment is performed automatically by the master entity 50, the remote pilot is selected depending on different crew workload, being the fleet manager on the loop of this handover operation to reassign the mobile entity to another remote pilot, if suitable.

Should the mobile entity status be so severe that the third state is justified, the control module 110 will make a resolution proposal to the remote pilot and wait for approval or other command. The remote pilot will either accept the resolution proposal or define own commands, but human action is needed in this case to solve the emergency situation. The remote pilot is therefore considered in-the-loop.

A transition to the third state implies that a remote pilot is assigned for the control and monitoring of the particular mobile entity. This assignment is performed automatically by the master entity, the remote pilot is selected depending on different crew workload, being the fleet manager on the loop of this handover operation to reassign the mobile entity to another remote pilot, if suitable.

Again, following the implementation of the corrective action, the control module 110 and/or the master entity 50 will re-assess the mobile entity status and maintain the state or transition to another state.

The management module 54 is configured to enable a fleet manager to supervise and control multiple mobile entities 100 and operation. The fleet manager may assign, by interoperating with the management module 54 and executing an assignment command, operation of a mobile entity to a remote control module 56. In this case, the fleet manager does not control the mobile entity, but only monitors it.

The management module 54 is configured to manage and resolve route conflicts and ensures that each mobile entity making up a critical service/mission is assigned to a particular remote control module 56. The management module is configured to adapt the flight path of an individual mobile entity to fly around areas with high traffic congestion. The management module 54 is further configured to monitor a fleet of mobile entities that requires a high-level human-machine-interface to reduce the information of an individual mobile entity to a minimum level. Such a human-machine-interface implements a global map display that shows all the mobile entities as symbols on a map with the status of each mobile entity clearly visible from this view (e.g., by using different colors). Mobile entities in the first state may be ignored because they are supposed to handle the required tasks and action by themselves; the green color may be used for these mobile entities. Mobile entities in the second state are configured to inform the management module 54 about changes in their planned behavior. For example, a changed route is highlighted, changed estimated time of arrival is highlighted, etc. A mobile entity in the second state does not require fleet manager action apart from being made aware of the nature of the contingency situation. A resolution proposal or flight plan replanning from the mobile entity is provided to the management module to solve the second state. The fleet manager or any other human operator has the ability to abort the action scheduled by the mobile entity or to actively approve the action for certain special cases. The second state may also imply an automatic monitoring handover to the most suitable remote control module 56 and a remote pilot, performed by the master entity. In this situation, the fleet manager is responsible for the control and monitoring of the mobile entity and the remote pilot is aware of the mobile entity operation in monitoring mode. Mobile entities in the third state may not be able to solve the current situation on their own. The management module 54 is configured to assign the mobile entities in the third state to an available remote control module 56 for being monitored and commanded by a remote pilot via the remote control module 56. The management module 54 may automatically assign a mobile entity 100 to the remote control module 56 and a human operator of the management module may overrule the automatic assignment or may assign manually, if deemed necessary.

The remote control module 56 is configured to enable a remote pilot to control the mobile entity 100 remotely, especially in conditions of emergency, e.g., during air traffic control voice communication failure, the remote pilot is responsible for following the procedures for loss of communication stated in the ICAO Rules of the Air. The remote pilot should also try to establish contact with air traffic control, possibly with other means such as telephone, when necessary. During loss of control datalink (datalink between the remote control module and the mobile entity), the remote pilot should communicate with air traffic control using backup means and be able to explain what the aircraft will do when necessary. When the control link is re-established, the remote pilot should in agreement with air traffic control decide how the flight should continue, e.g., follow the original filed air traffic control flight plan, return to base, or fly to an alternate airfield.

Appropriate automation schemes may be implemented in the remote control module 56 to allow the execution of a set of command and monitoring tasks while maintaining the workload at an acceptable level.

In order to facilitate their role, the remote pilot requires at least the following information and is provided with this information by the remote control module 56. The remote control module 56 comprises a global map display that is configured to focus on mobile entities that are in the second or third state. However, the global map display may also show the mobile entities that operate in the first state, although the mobile entities in the first state do not require an action by the fleet manager. For assigned mobile entities that are in the third state, the following information is provided to the remote pilot: all information necessary to understand the detailed status of the mobile entity, a resolution proposal or flight plan replanning from the mobile entity, all information required from the operational environment, including air traffic control, unmanned aerial system traffic management, weather, etc., input elements suitable to command the mobile entity to control the mobile entity so third parties are not harmed or disturbed and the mobile entity is protected as good as possible.

Figure 5:
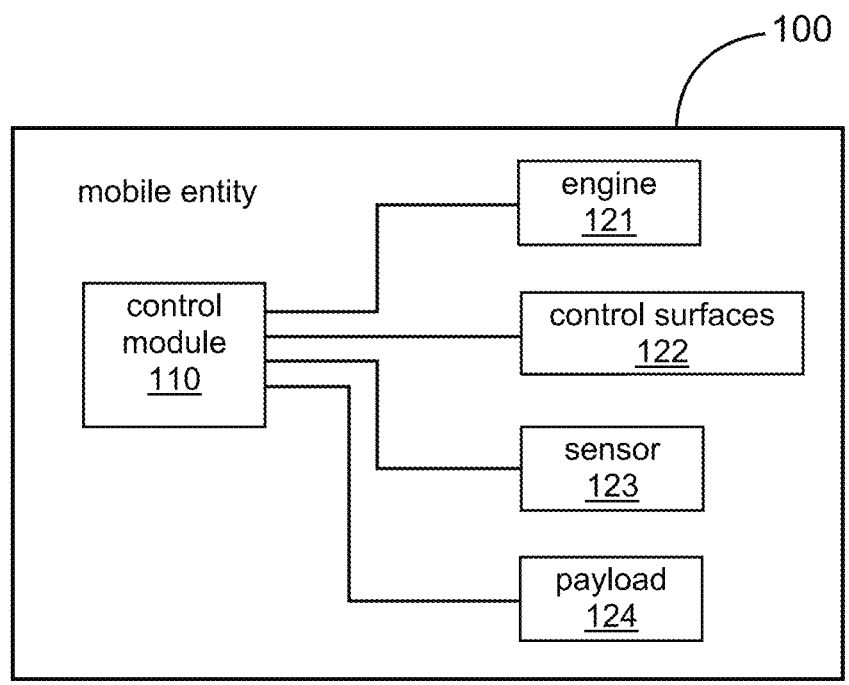
FIG. 5 is a schematic representation of a mobile entity and its function components.

FIG. 5 generally and schematically shows the structure and function of a mobile entity 100. The mobile entity 100 comprises a control module 110 and multiple function components like an engine 121, control surfaces 122, a sensor 123, and a payload 124. The mobile entity 100 may comprise one or more engines 121. The mobile entity 100 may comprise multiple sensors 123 that are configured to detect the status of the mobile entity or its components and/or the surroundings of the mobile entity. The payload 124 may be an internal or external payload to the mobile entity. The control module 110 receives data from the function components and sends control commands as described herein in accordance with the first, second, and third state.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without de-parting from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 System
15 air traffic control
17 communication interface
50 master entity
52 communication interface
54 management module
56 remote control module
57 human-machine-interface
58 control module
100 mobile entity, aircraft
102 communication interface
103 data link
104 data link
105 data link
110 control module
120 function component
121 engine
122 control surface
123 sensor
124 payload, internal or external

The invention claimed is:

1. A system for controlling operation of a plurality of mobile entities, the system comprising:
   a plurality of mobile entities;
   a master entity that is communicatively coupled to the plurality of mobile entities, the master entity comprising a management module and multiple remote control modules;
   each of the plurality of mobile entities comprising a control module and one or more function components;
   the control module configured to control operation of the one or more function components;
   the control module configured to selectively operate in any of a first state, a second state, or a third state;
   wherein, in the first state, the control module is configured to receive input data from the one or more function components, generate control commands for controlling the one or more function components based on the input data, and autonomously control the one or more function components based on the control commands to follow a predetermined mission plan;
   wherein, in the second state, the control module is configured to receive input data from the one or more function components, generate preliminary control commands for controlling the one or more function components based on the input data, wherein the preliminary control commands represent an option for continuing a mission, transmit the preliminary control commands to the master entity, control the one or more function components based on the preliminary control commands in response to the master entity not overruling the preliminary control commands within a predetermined time period, otherwise, in response to the master entity overruling the preliminary control commands within the predetermined time period by sending alternative control commands, control the one or more function components based on the alternative control commands received from the master entity, wherein the master entity is configured to autonomously send a command confirmation to the mobile entity approving the preliminary control commands in response to the master entity receiving the preliminary control commands and after a predetermined time of receiving the preliminary control commands expires without an operating crew overruling the preliminary control commands;
   wherein, in the third state, the control module is configured to receive input data from the one or more function components, generate proposed control commands for controlling the one or more function components based on the input data and transmit the proposed control commands to the master entity, wherein the proposed control commands represent an option for continuing a mission, forward the input data and the proposed control commands to the master entity, receive control commands from the master entity, and control the one or more function components based on the control commands received from the master entity, and wherein, in response to either of a first condition or a second condition, wherein the first condition is met when no control commands are received from the master entity, and the second condition is met when the option for continuing the mission are not confirmed within a certain time, the mobile entity executes one of a contingency maneuver or aborting the mission to achieve a safe state;

wherein each mobile entity is configured to transmit a first alert signal to the master entity when the mobile entity transitions from one of the first state to one of the second state or the third state, wherein each mobile entity is configured to transmit a second alert signal to the master entity when the mobile entity transitions from the second state to the third state, wherein the first alert signal and the second alert signal are used in the master entity to cause an alert configured to direct the crew to one of the management module or one of the multiple remote control modules;

wherein, in the first state, the management module monitors and controls a first mobile entity of the plurality of mobile entities that is in the first state, without one of the multiple remote control modules and a remote pilot being assigned to the first mobile entity;

wherein, in the second state, the management module monitors and controls the first mobile entity of the plurality of mobile entities that is in the second state, and the master entity assigns the one of the multiple remote control modules and the remote pilot to the first mobile entity for monitoring the first mobile entity;

wherein, in the third state, the management module monitors the first mobile entity of the plurality of mobile entities that is in the third state, and the master entity assigns the one of the remote control modules and the remote pilot to the first mobile entity for additionally monitoring and controlling the first mobile entity.

2. The system of claim 1, wherein, in the first state, the control module is further configured to transmit the input data to the master entity.

3. The system of claim 1, wherein the one or more function components of the mobile entity is one of an engine, a control surface, a sensor, and a payload.

4. The system of claim 1, wherein the mobile entity is an unmanned aerial vehicle.

5. The system of claim 1:
wherein the management module is configured to observe a state of the plurality of mobile entities; and
wherein the management module is configured to assign controlling of the first mobile entity to a first remote control module, so that the first remote control module specifically controls the first mobile entity.

6. The system of claim 5, wherein the master entity is stationary or mobile.

7. The system of claim 5:
wherein the remote control module comprises a human-machine-interface for enabling a human operator to interact with the remote control module; and
wherein the remote control module comprises a control module that is configured to generate and transmit control commands to the mobile entity.

8. The system of claim 1:
wherein the master entity comprises a communication interface;
wherein the first mobile entity of the plurality of mobile entities comprises a communication interface; and
wherein the first mobile entity is configured to establish a wireless data link to the master entity via the respective communication devices.

9. The system of claim 1:
wherein the plurality of mobile entities and the master entity are configured to request data and receive commands from an air traffic control, wherein the requested data relate to air traffic in surroundings of the plurality of mobile entities, a route change, or an altitude change; and
wherein the control module of the plurality of mobile entities is further configured to generate commands for controlling the plurality of mobile entities based on the data from the air traffic control.

10. The system of claim 1, wherein, in the second state, the time period within which the master entity can overrule the preliminary control commands generated by the control module of the plurality of mobile entities is at maximum 10 seconds.

* * * * *